United States Patent
Gill et al.

(10) Patent No.: US 11,180,196 B2
(45) Date of Patent: Nov. 23, 2021

(54) STRUCTURAL JOINING PART FOR SORB IMPACT EVENTS

(71) Applicants: Amandeep S Gill, Rochester Hills, MI (US); Scott E Zilincik, Troy, MI (US); Tusher M Phule, Auburn Hills, MI (US); Eric E Lund, Oxford, MI (US); Martin L Hilderth, Rochester, MI (US)

(72) Inventors: Amandeep S Gill, Rochester Hills, MI (US); Scott E Zilincik, Troy, MI (US); Tusher M Phule, Auburn Hills, MI (US); Eric E Lund, Oxford, MI (US); Martin L Hilderth, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 124 days.

(21) Appl. No.: 16/541,825

(22) Filed: Aug. 15, 2019

(65) Prior Publication Data

US 2020/0223493 A1 Jul. 16, 2020

Related U.S. Application Data

(60) Provisional application No. 62/792,046, filed on Jan. 14, 2019.

(51) Int. Cl.
| | |
|---|---|
| *B62D 25/20* | (2006.01) |
| *B62D 25/14* | (2006.01) |
| *B62D 25/08* | (2006.01) |
| *B62D 25/00* | (2006.01) |

(Continued)

(52) U.S. Cl.
CPC ......... *B62D 25/2045* (2013.01); *B60G 7/001* (2013.01); *B62D 21/05* (2013.01);
(Continued)

(58) Field of Classification Search
CPC .... B62D 23/00; B62D 25/20; B62D 25/2018; B62D 25/2009; B62D 25/27; B62D 25/00;
(Continued)

(56) References Cited

U.S. PATENT DOCUMENTS

| | | | | |
|---|---|---|---|---|
| 4,892,350 A | * | 1/1990 | Kijima | B62D 25/025 296/187.12 |
| 4,964,672 A | | 10/1990 | Fujii | |

(Continued)

FOREIGN PATENT DOCUMENTS

| | | | | |
|---|---|---|---|---|
| EP | 1116641 A2 | * | 7/2001 | ............. B62D 25/04 |
| EP | 3100935 A1 | | 12/2016 | |

(Continued)

OTHER PUBLICATIONS

Nakagami, Tamura, and Mazda Motor Corp, "Front Part Vehicle Body Structure For Vehicle", Jul. 21, 2005, Japanese Patent Office . (Year: 2005).*

(Continued)

*Primary Examiner* — Dennis H Pedder
*Assistant Examiner* — Joyce Eileen Hill
(74) *Attorney, Agent, or Firm* — Ralph E. Smith

(57) ABSTRACT

A structural panel joining part for a vehicle having an underbody hold-down panel, a floor panel, a dash panel, and a cowl side panel includes an underbody coupling first portion configured to couple to at least one of the underbody hold-down panel and the floor panel, a dash panel coupling second portion configured to couple to the dash panel, and a cowl side coupling third portion configured to couple to the cowl side panel. The structural panel joining part maintains structural integrity between the underbody hold-down panel, the floor panel, the dash panel, and the cowl side panel to provide structural reinforcement during small overlap rigid barrier impacts to facilitate reducing structural intrusion into an occupant compartment of the vehicle.

13 Claims, 5 Drawing Sheets

(51) Int. Cl.
  *B62D 23/00* (2006.01)
  *B62D 27/00* (2006.01)
  *B62D 27/02* (2006.01)
  *B62D 21/05* (2006.01)
  *B62D 21/06* (2006.01)
  *B62D 21/15* (2006.01)
  *B60G 7/00* (2006.01)

(52) U.S. Cl.
  CPC ........... *B62D 21/06* (2013.01); *B62D 21/152* (2013.01); *B62D 21/157* (2013.01); *B62D 23/005* (2013.01); *B62D 27/02* (2013.01); *B62D 27/026* (2013.01); *B60G 7/005* (2013.01); *B60G 2204/1224* (2013.01); *B60G 2204/148* (2013.01); *B60G 2204/416* (2013.01); *B60G 2206/016* (2013.01); *B60G 2206/124* (2013.01); *B62D 23/00* (2013.01); *B62D 25/00* (2013.01); *B62D 25/081* (2013.01); *B62D 25/14* (2013.01); *B62D 25/20* (2013.01); *B62D 25/2009* (2013.01); *B62D 25/2018* (2013.01); *B62D 27/00* (2013.01)

(58) Field of Classification Search
  CPC .... B62D 25/2045; B62D 27/00; B62D 27/02; B62D 21/05; B62D 21/06; B62D 21/152; B62D 21/157; B62D 23/005; B62D 27/026; B62D 25/081; B62D 25/14; B60G 7/001; B60G 7/005; B60G 2204/1224; B60G 2204/148; B60G 2204/416; B60G 2206/016; B60G 2206/124
  USPC .............................. 296/187.08, 203.01, 198
  See application file for complete search history.

(56) References Cited

U.S. PATENT DOCUMENTS

| | | | |
|---|---|---|---|
| 6,688,676 B1 * | 2/2004 | Sato | B62D 21/152 296/187.05 |
| 8,469,442 B1 * | 6/2013 | Pencak | B62D 25/16 296/187.12 |
| 8,602,454 B1 | 12/2013 | Baccouche et al. | |
| 8,657,369 B2 | 2/2014 | Mildner et al. | |
| 9,266,567 B1 * | 2/2016 | Young | B62D 24/04 |
| 9,381,952 B2 | 7/2016 | Furusaki et al. | |
| 9,487,236 B2 * | 11/2016 | Ozawa | B62D 25/082 |
| 2008/0111397 A1 * | 5/2008 | Yamada | B62D 25/16 296/193.09 |
| 2012/0043785 A1 * | 2/2012 | Mildner | B62D 25/082 296/193.02 |
| 2013/0200650 A1 * | 8/2013 | Matsuoka | B62D 21/155 296/187.1 |
| 2013/0257105 A1 | 10/2013 | Mildner et al. | |
| 2017/0247057 A1 * | 8/2017 | Tatsuwaki | B62D 25/145 |
| 2019/0084514 A1 * | 3/2019 | Izutsu | B60R 21/02 |

FOREIGN PATENT DOCUMENTS

| | | | |
|---|---|---|---|
| JP | 2005193843 A | * | 7/2005 |
| JP | 4483592 B2 | | 6/2010 |
| KR | 20150050886 A | | 5/2015 |
| KR | 101673340 B1 | | 11/2016 |

OTHER PUBLICATIONS

Dipling et al, "Front structure fora motor vehicle", Jul. 18, 2001, German Patent Office (Year: 2001).*

* cited by examiner

STRUCTURAL JOINING PART FOR SORB IMPACT EVENTS

CROSS REFERENCE TO RELATED APPLICATION

This application claims the benefit of U.S. Provisional Application No. 62/792,046, filed Jan. 14, 2019, the contents of which are incorporated in their entirety by reference thereto.

FIELD

The present application relates generally to vehicle structural systems and, more particularly, to vehicle structural systems to reduce potential occupant compartment intrusion in small overlap rigid barrier frontal impact events.

BACKGROUND

Some vehicles include impact protection structures to absorb energy from an impact event to protect vehicle occupants. In a small overlap impact event, a large amount of the impact is directed outboard of the main energy absorbing structures, and front portions of the vehicle may deform. Thus, while such impact protection structures do work well for their intended purpose, it is desirable to provide continuous improvement in the relevant art.

SUMMARY

In accordance with one example aspect of the invention, a structural panel joining part for a vehicle having an underbody hold-down panel, a floor panel, a dash panel, and a cowl side panel is provided. In one example implementation, the structural panel joining part includes an underbody coupling first portion configured to couple to at least one of the underbody hold-down panel and the floor panel, a dash panel coupling second portion configured to couple to the dash panel, and a cowl side coupling third portion configured to couple to the cowl side panel. The structural panel joining part maintains structural integrity between the underbody hold-down panel, the floor panel, the dash panel, and the cowl side panel to provide structural reinforcement during small overlap rigid barrier impacts to facilitate reducing structural intrusion into an occupant compartment of the vehicle.

In addition to the foregoing, the described structural panel joining part may have one or more of the following features: a main body panel extending between the first, second, and third portions; wherein the first portion is an underbody end of the main body panel, the second portion is a dash flange extending from the main body panel, and the third portion is a side flange extending from the main body panel; wherein the main body panel is generally triangular and configured to extend across a corner opening formed by a convergence of the floor panel, the dash panel, and the cowl side panel; and an interior surface and an exterior surface, wherein the interior surface of the underbody end is configured to couple to the floor panel, the exterior surface of the underbody end is configured to couple to the underbody hold-down panel, the exterior surface of the dash flange is configured to couple to the dash panel, and the exterior surface of the side flange is configured to couple to the cowl side panel.

In addition to the foregoing, the described structural panel joining part may have one or more of the following features: a first directional stiffening bead formed in the main body panel; wherein the first directional stiffening bead defines a depression in the main body panel defined at least partially by a bottom wall, an upper wall, a lower wall, and first and second end walls; a second directional stiffening bead formed in the main body panel; and wherein the first and second directional stiffening beads extend from the third portion toward the second portion.

In accordance with another example aspect of the invention, a vehicle is provided. In one example implementation, the vehicle includes a structural underbody hold-down panel, a structural floor panel disposed on the underbody hold-down panel, a structural dash panel, a structural cowl side panel, and a corner defined at a convergence of the underbody hold-down panel, the floor panel, the dash panel, and the cowl side panel. A structural panel joining part is disposed in the corner and is coupled to the underbody hold-down panel, the floor panel, the dash panel, and the cowl side panel to maintain structural integrity therebetween and provide structural reinforcement during small overlap rigid barrier impacts to facilitate reducing structural intrusion into an occupant compartment of the vehicle.

In addition to the foregoing, the described vehicle may have one or more of the following features: wherein the structural panel joining part includes an interior surface and an opposite exterior surface, a main body panel, an underbody end, a dash flange extending from the main body panel, and a side flange extending from the main body panel; wherein the underbody end is coupled to the floor panel via a row of spot welds; wherein the underbody end is coupled to both the floor panel and the underbody hold-down panel via a row of spot welds; wherein the dash flange is coupled to the dash panel via a row of spot welds; and wherein the side flange is coupled to the cowl side panel via two rows of spot welds and advanced impact structural adhesive.

In addition to the foregoing, the described vehicle may have one or more of the following features: a directional stiffening bead formed in the main body panel, the directional stiffening bead defining a depression in the main body panel defined at least partially by a bottom wall, an upper wall, a lower wall, and first and second end walls; and wherein the interior surface of the underbody end is coupled to a lower side of the floor panel via a row of first 2T spot welds, the i interior surface of the underbody end is coupled to the lower side of the floor panel, and the exterior surface of the underbody end is coupled to an upper side of the underbody hold-down panel via a row of first 3T spot welds, the exterior surface of the dash flange is coupled to the dash panel via a row of second 2T spot welds, the exterior surface of the side flange is coupled to the cowl side panel via (i) rows of respective third and fourth 2T spot welds and (ii) an advanced impact structural adhesive, and the interior surface of the dash flange is coupled to the lower side of the floor panel, and the exterior surface of the dash flange is coupled to the dash panel via a second 3T weld.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Described herein is a vehicle body structure configured to provide structural reinforcement in right and left small overlap rigid barrier impacts. The vehicle body structure includes a structural joining part that couples and maintains the structural integrity between three main cab assemblies; namely a cowl side assembly, an underbody/floor assembly, and a dash assembly. Directional stiffening beads provide additional stiffness and strength against floor deformation and facilitates reduced structural intrusion from wheel interaction to the front floor. In some examples, joining between the cab assemblies is achieved through a unique combination of resistance spot welds and advanced impact structural adhesives to establish superior structural integrity between the cab assemblies during wheel interaction in the impact event.

Figure 1:
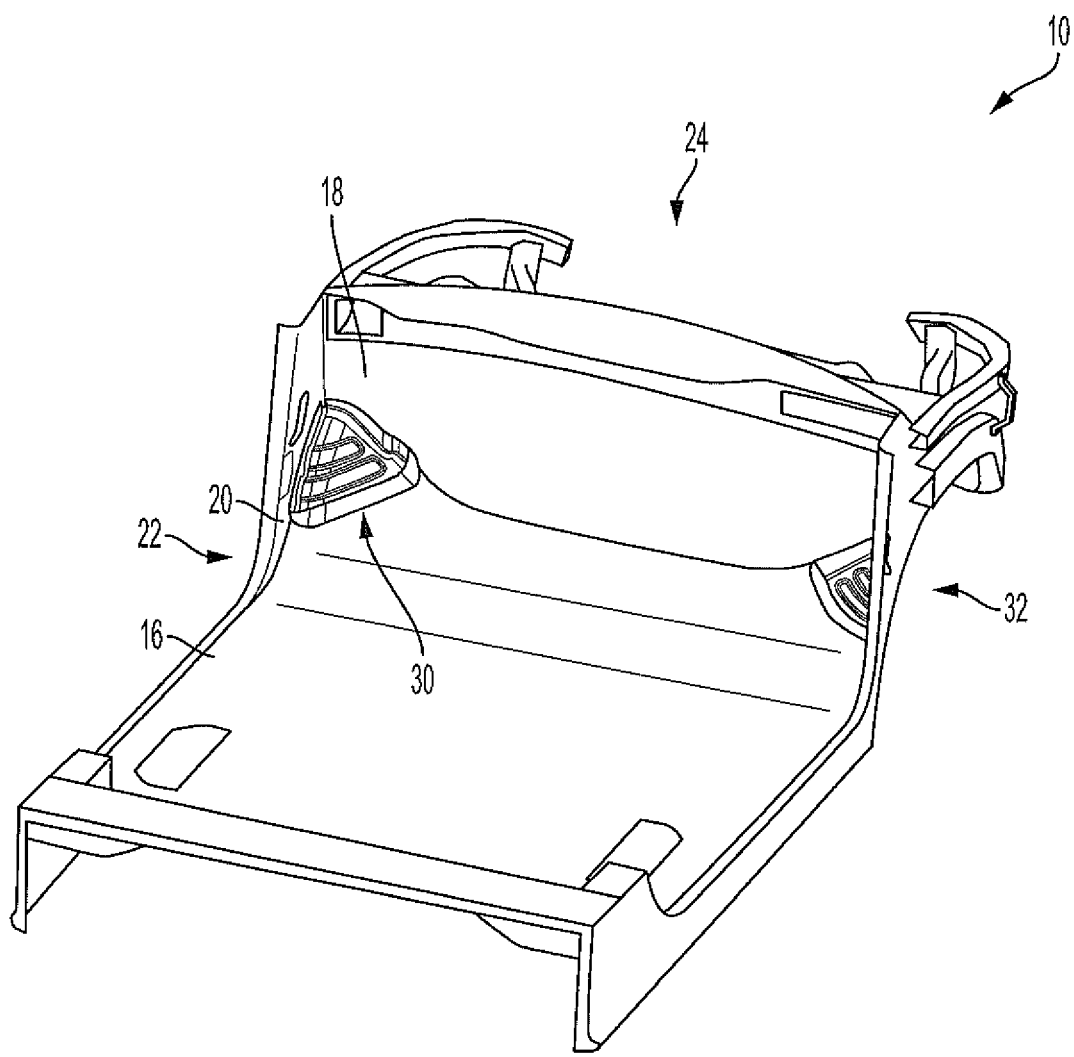
FIG. 1 is a perspective view of a portion of an example vehicle with a structural panel joining part joining a floor panel, a dash panel, and a cowl side panel, in accordance with the principles of the present application.

With reference to FIG. 1, an example portion of a vehicle is generally shown and indicated at reference numeral 10. In the example embodiment, the vehicle 10 is configured to maintain structural integrity during impact or collision events, particularly during SORB (small overlap, rigid barrier) testing. As such, the vehicle 10 is configured to provide desired interaction of body and frame systems to thereby reduce or prevent structural intrusion from front suspension corners that can affect lower foot/leg injury metrics for drivers and front passengers.

In the example embodiment, the vehicle 10 is a body on frame vehicle and generally includes a frame (not shown), an underbody hold-down panel 14 (FIG. 2), a floor panel 16, a dash panel 18, and opposed cowl side panels 20. The underbody hold-down panel 14 extends generally vehicle fore-aft and is configured to provide structural support for various vehicle components. The floor panel 16 is disposed on top of underbody hold-down panel 14 generally parallel to the ground and is configured to partially define a passenger or occupant compartment 22. The dash panel 18 extends generally cross-car and is configured to at least partially separate the vehicle occupant compartment 22 from a vehicle engine compartment 24. The cowl side panels 20 extend generally vertically between vehicle fore-aft and are configured to define side supports or structure of the vehicle 10.

Figure 2:
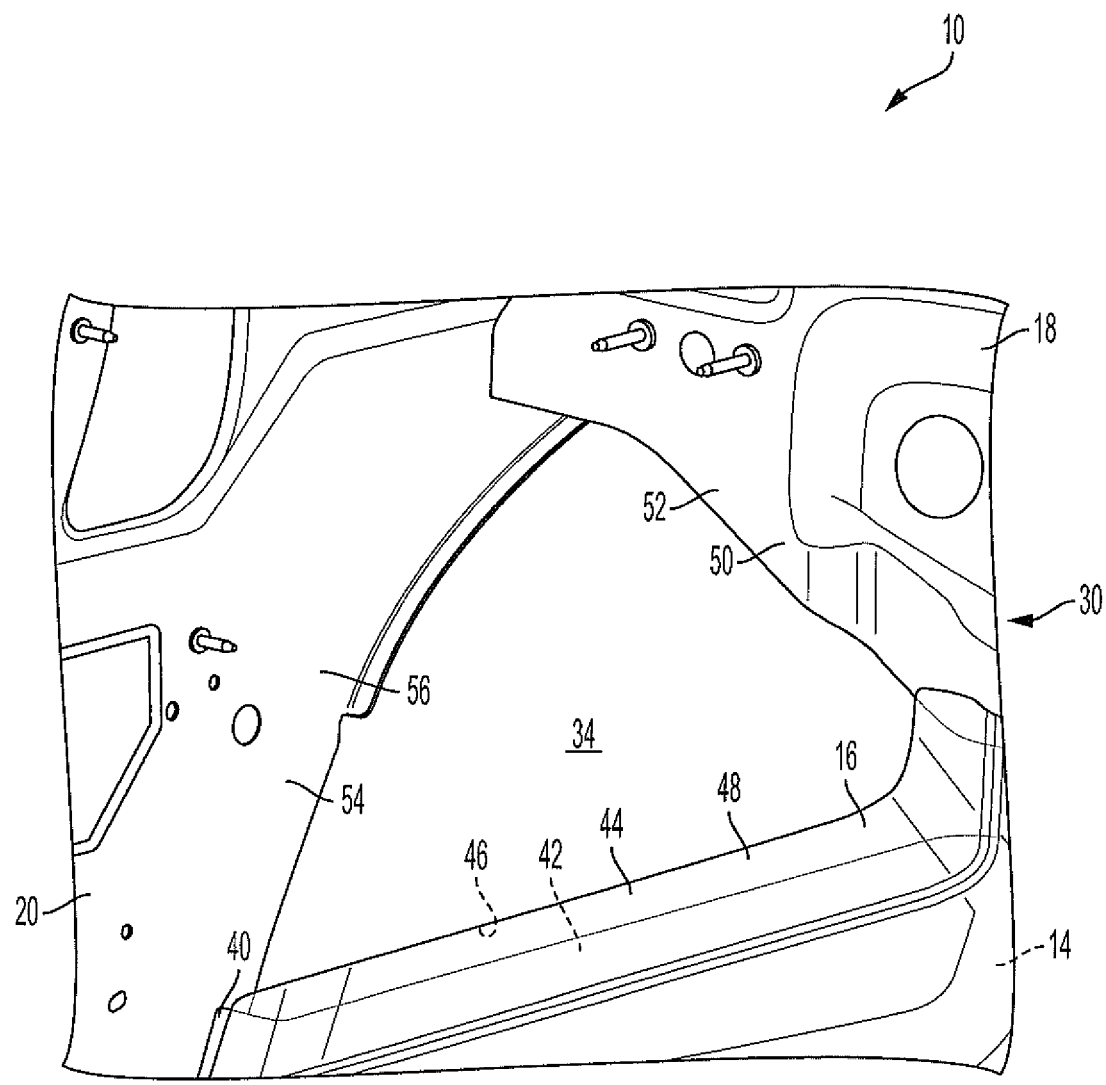
FIG. 2 is a perspective view of a corner convergence of the floor panel, dash panel, and cowl side panel, the floor panel shown in transparent to illustrate an underlying example underbody hold-down panel, in accordance with the principles of the present application.

With additional reference to FIG. 2, the hold-down panel 14/floor panel 16, the dash panel 18, and the cowl side panel 20 all converge together at a front left side (driver side) corner 30 and a front right side (passenger side) corner 32 of the occupant compartment 22 proximate where front passenger lower legs typically reside (e.g., toe-pan area). A corner gap or opening 34 (FIG. 2) is defined at the convergence of the floor panel 16, dash panel 18, and cowl side panel 20 in each corner 30, 32 (only shown in front left corner 30). At this convergence, underbody hold-down panel 14 defines an upper surface 40 and a panel edge 42, and floor panel 16 defines an upper surface 44, a lower surface 46, and a panel edge 48. The dash panel 18 defines an interior surface 50 and a panel edge 52, and the cowl side panel 20 defines an inner side surface 54 and a panel edge 56.

Figure 3:
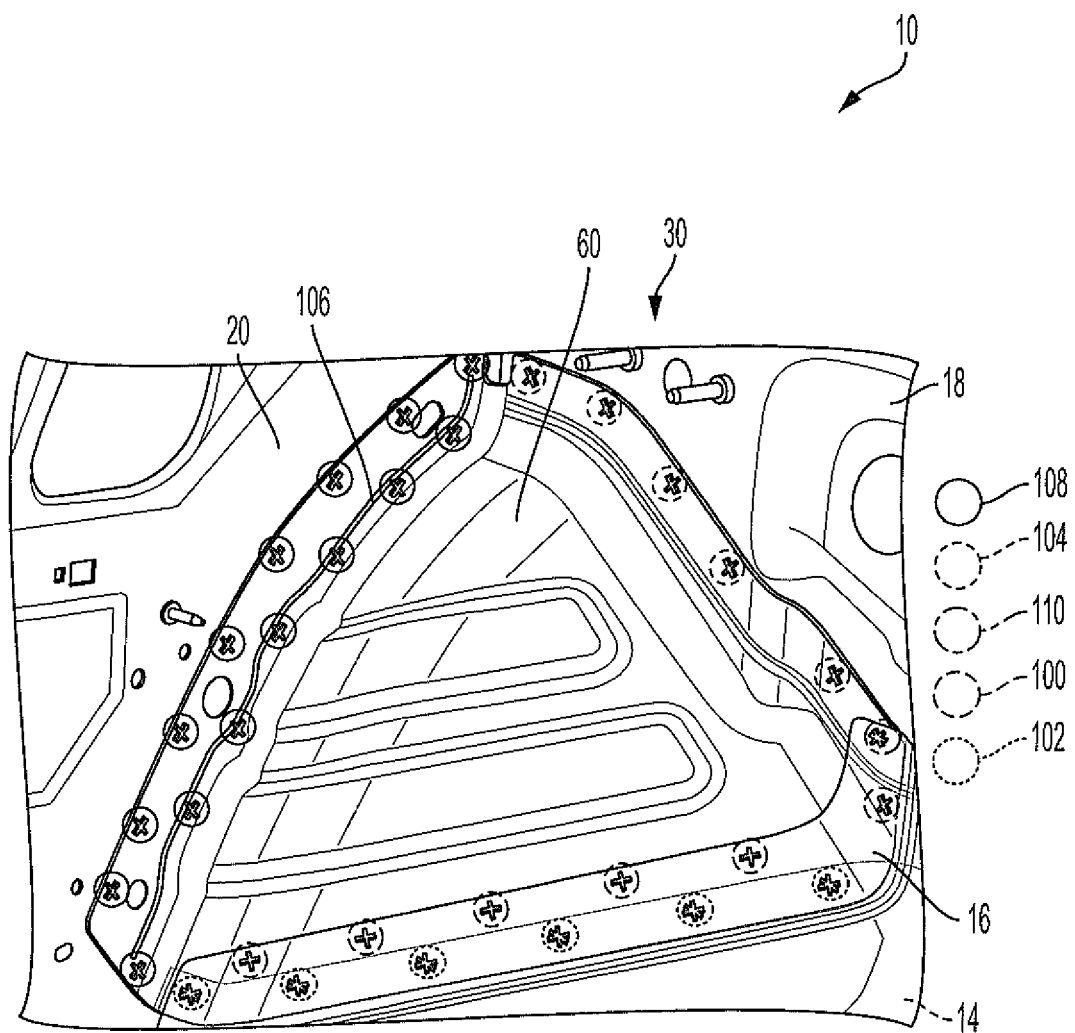
FIG. 3 is a perspective view of the example structural panel joining part of FIG. 1 covering the corner convergence shown in FIG. 2, in accordance with the principles of the present application.

With additional reference to FIG. 3, in order to prevent intrusion into the toe-pan area of the occupant compartment 22, particularly during SORB impacts, a structural joining part or bracket 60 is oriented over the corner opening 34 and joins the underbody hold-down panel 14, floor panel 16, the dash panel 18, and the cowl side panel 20 together. This joining of the three panel assemblies provides increased structural integrity during impact events, particularly SORB impact events, thereby resulting in reduced structural intrusion from wheel interaction that may affect lower foot/leg injury metrics for drivers and front passengers. Further, as described herein in more detail, the structural panel joining bracket 60 utilizes unique resistance spot welding and/or structural impact adhesive to join the underbody hold-down panel 14, the floor panel 16, the dash panel 18, and the cowl side panel 20.

Figure 4:
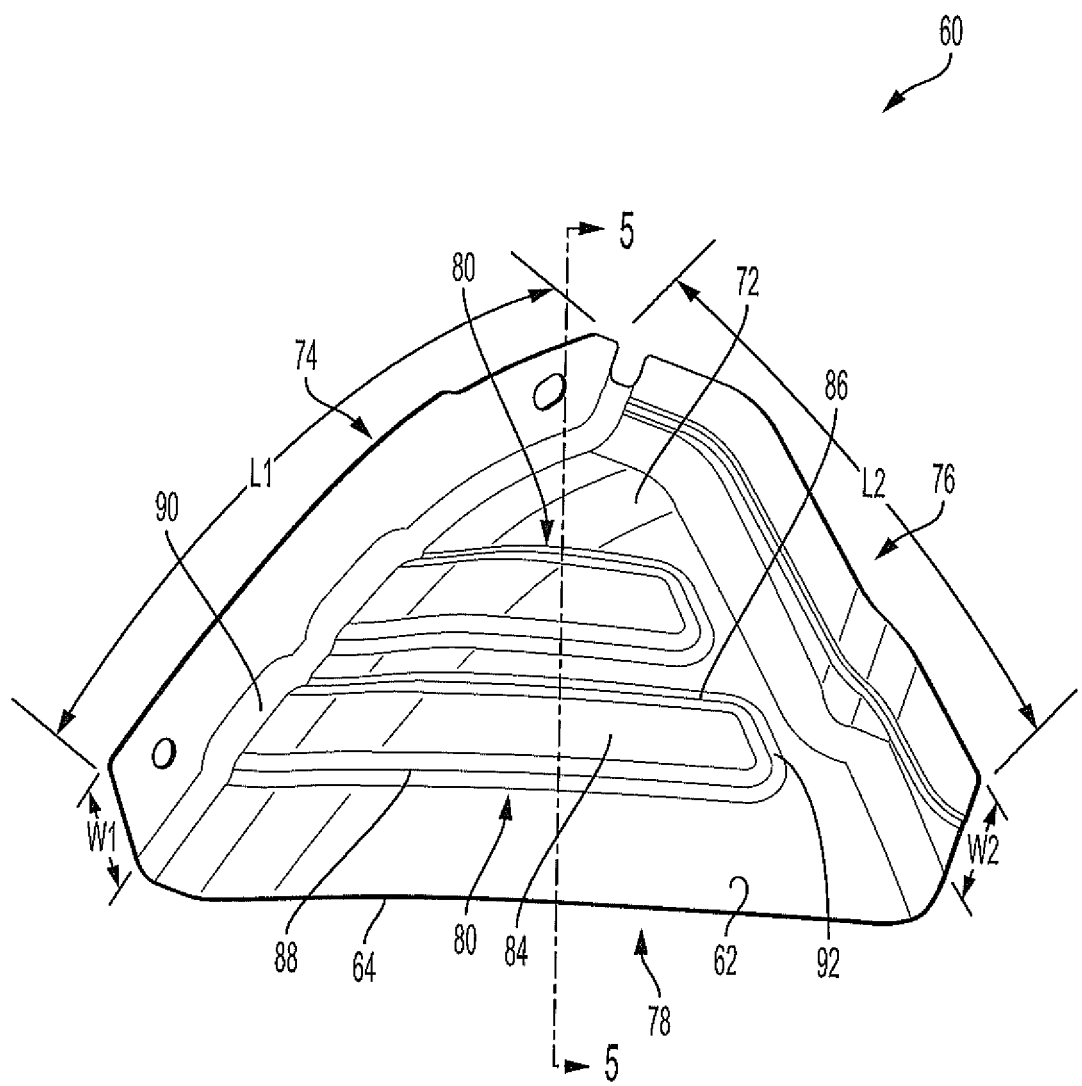
FIG. 4 is a top perspective view of the example structural panel joining part shown in FIG. 1, in accordance with the principles of the present application.
Figure 6:
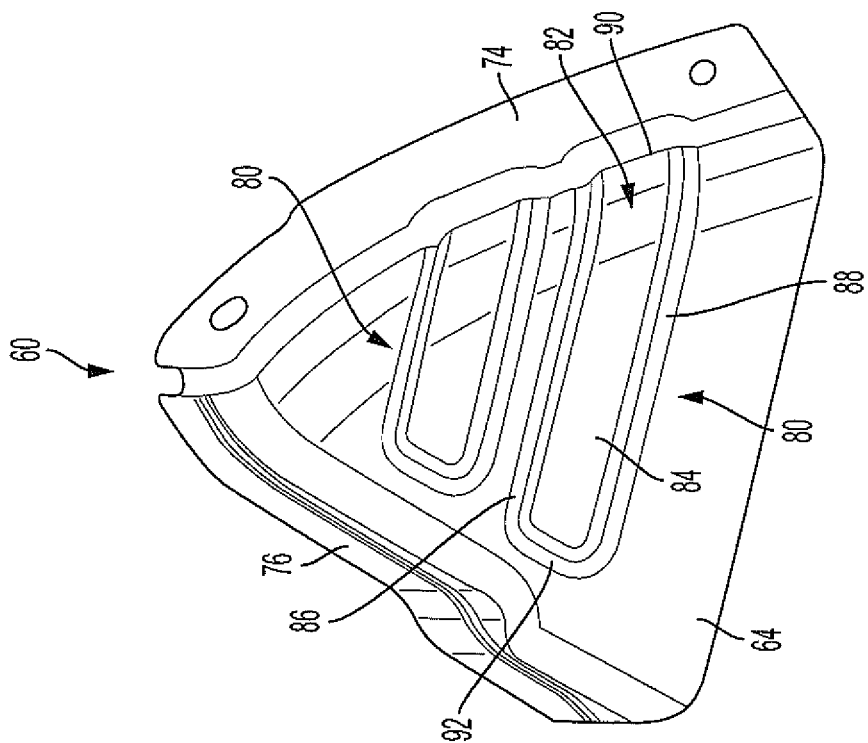
FIG. 6 is a bottom perspective view of the example structural panel joining part shown in FIG. 4, in accordance with the principles of the present application.

In the example embodiment, the structural panel joining bracket 60 is generally triangular and includes an interior surface 62 and an opposite exterior surface 64. As shown in FIGS. 4 and 6, the structural joining bracket 60 includes a main body panel 72, a side flange 74, a dash flange 76, and an underbody end 78. In one embodiment, the structural panel joining bracket 60 is fabricated from high strength steel (e.g., DP 780) with a predetermined gage. In one example, the gage is between 1.4 mm and 1.8 mm or between approximately 1.4 mm and approximately 1.8 mm. In other examples, the gage is 1.6 mm or approximately 1.6 mm.

Figure 5:
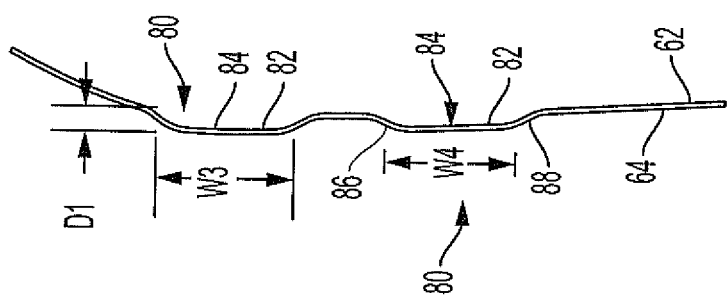
FIG. 5 is a sectional view of the example structural panel joining part shown in FIG. 4 and taken along line 5-5, in accordance with the principles of the present application.

With additional reference to FIGS. 4-6, in the example embodiment, side flange 74 is formed with a length 'L1' and a width 'W1', and dash flange 76 is formed with a length 'L2' and a width 'W2'. In one example, length 'L1' is between approximately 250 mm and approximately 400 mm or between 250 mm and 400 mm. In another example, length 'L1' is between approximately 300 mm and approximately 360 mm or between 300 mm and 360 mm. In yet another example, length 'L1' is 330 mm or approximately 330 mm. In one example, width 'W1' is between approximately 30 mm and approximately 60 mm, or between 30 mm and 60 mm. In another example, width 'W1' is 45 mm or approximately 45 mm.

In one example, length 'L2' is between approximately 220 mm and approximately 380 mm, or between 220 mm and 380 mm. In another example, length 'L2' is between approximately 270 mm and approximately 330 mm, or between 270 mm and 330 mm. In yet another example, length 'L2' is 305 mm or approximately 305 mm. In one example, width 'W2' is between approximately 15 mm and approximately 30 mm, or between 15 mm and 30 mm. In another example, width 'W2' is 20 mm or approximately 20 mm.

Further, in the example embodiment, the main body panel 72 can include one or more directional stiffening ribs or beads 80 configured to provide further stiffening and structural rigidity to prevent or reduce floor deformation. The directional stiffening bead 80 may be formed, for example, via a stamping operation. In the illustrated example, each directional stiffening bead 80 defines a depression 82 (FIG. 6) formed in the main body panel 72 and defined at least partially by a bottom wall 84, an upper wall 86, a lower wall 88, and end walls 90, 92. In the example embodiment, main body panel 72 includes two directional stiffening beads 80 extending from the side flange 74 toward the dash flange 76. In the illustrated example, the directional stiffening beads 80 extend horizontally only over a portion of the distance between flanges 74, 76. However, it will be appreciated that in some examples, the directional stiffening bead 80 can extend the entire distance between flanges 74, 76 and/or at various other orientations (e.g., vertically).

In the example embodiment shown in FIGS. 4 and 5, directional stiffening beads 80 are formed with a depth 'D1', width 'W3', and a length 'L3' or 'L4'. In one example, depth D1 is between approximately 2 mm and approximately 8 mm, or between 2 mm and 8 mm. In another example, depth 'D1' is 5 mm or approximately 5 mm. In one example, width 'W3' is between approximately 25 mm and approximately 75 mm, or between 25 mm and 75 mm. In another example, width 'W3' is 50 mm or approximately 50 mm. In the illustrated example, length 'L3' is less than length 'L4'. In other embodiments, length 'L3' is greater than or equal to length 'L4'.

With continued reference to FIG. 3, as discussed, structural panel joining bracket 60 is utilized to structurally join the underbody hold-down panel 14, the floor panel 16, the dash panel 18, and the cowl side panel 20. More particularly, in the illustrated example, the exterior surface 64 of side flange 74 is coupled to the inner side surface 54 of the cowl side panel edge 56, and the exterior surface 64 of dash flange 76 is coupled to the interior surface 50 of the dash panel edge 52. Additionally, the exterior surface 64 of the underbody end 78 is coupled to the upper surface 40 of the hold-down panel edge 42, and the interior surface 62 of the underbody end 78 is coupled to the lower surface 46 of the floor panel edge 48. In one example, the main body panel is coupled to and joins at least each of the dash panel and the cowl side panel at acute angles relative thereto.

As illustrated in FIG. 3, structural panel joining bracket 60 is coupled to underbody hold-down panel 14, floor panel 16, dash panel 18, and cowl side panel 20 via welding (e.g., resistance spot welding) and an advanced impact structural adhesive (e.g., metal joining structural adhesive). In the example embodiment, a first row of 2T spot welds 100 couple the interior surface 62 of the underbody end 78 to the lower surface 46 of the floor panel edge 48. A second row of 3T spot welds 102 further couple the interior surface 62 of the underbody end 78 to the lower surface 46 of the floor panel edge, as well as couple the exterior surface 64 of the underbody end 78 to the upper surface 40 of the hold-down panel edge 42. In the illustrated example, spot welds 100 and spot welds 102 are arranged in an alternating, shingled orientation to facilitate preventing intrusion of water into the occupant compartment 22 through the interface between structural joining bracket 60 and the floor panel 16.

In the example embodiment, a third row of 2T spot welds 104 couple the interior surface 50 of the dash panel edge 52 to the exterior surface 64 of dash flange 76. An advanced impact structural adhesive 106 is applied to one or both of the exterior surface 64 of side flange 74 and the inner side surface 54 of the cowl side panel edge 56 for coupling therebetween. Additionally, two rows of 2T spot welds 108 couple the exterior surface 64 of side flange 74 to the inner side surface 54 of the cowl side panel edge 56. Finally, a 3T spot weld 110 couples the interior surface 50 of the dash panel edge 52 to the exterior surface 64 of the dash flange 76, as well as couples the interior surface 62 of the dash flange 76 to the lower surface 46 of the floor panel edge 48.

In the illustrated example, the structural panel joining bracket 60 is coupled to underbody hold-down panel 14, floor panel 16, dash panel 18, and cowl side panel 20 using six spot welds 100, six spot welds 102, five spot welds 104, fifteen spot welds 108, and one spot weld 110. However, it will be appreciated that any suitable number of spot welds 100, 102, 104, 108, 110 and rows thereof are contemplated that enable structural panel joining bracket 60 and vehicle 10 to function as described herein. Moreover, although described with advanced impact structural adhesive 106 disposed only between cowl side panel 20 and structural panel joining bracket 60, it will be appreciated that advanced impact structural adhesive may additionally be utilized for coupling between structural joining bracket 60 and the underbody hold-down panel 14, the floor panel 16, and/or the dash panel 18.

In one example method of assembly, the underbody hold-down panel 14 is provided and the floor panel 16 is disposed thereon. The structural panel joining bracket 60 is then firstly coupled to the floor panel 16 via the spot welds 100. Next, the structural panel joining bracket 60 is coupled to the underbody hold-down panel 14 and floor panel 16 via spot welds 102. The dash panel 18 is then brought into contact with structural panel joining bracket 60 and secured thereto via spot welds 104. Advanced impact structural adhesive 106 is applied to structural panel joining bracket 60 and/or cowl side panel 20, and cowl side panel 20 is brought into contact with bracket 60 and further secured thereto via spot welds 108. Finally, the structural panel joining bracket 60 is secured to the floor panel 16 and the dash panel 18 via spot weld 110.

Described herein are systems and methods for reinforcing a vehicle structure to reduce occupant compartment intrusion during impact events, particularly lower leg area intrusion during SORB impacts. The system includes a structural panel joining part to simultaneously join and couple an underbody hold-down panel, a floor panel, a dash panel, and a cowl side panel utilizing a combination of resistance spot welds and advanced impact structural adhesive. The described systems facilitate eliminating the need for additional dash reinforcements (e.g., CWI), eliminating a foot rest part, maintaining interior packaging space and occupant compartment space, and reducing localized toe-pan intrusion.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:
1. A vehicle, comprising:
a structural underbody hold-down panel;
a structural floor panel disposed on the underbody hold-down panel;
a structural dash panel;
a structural cowl side panel;

an open corner defining an opening at a convergence of the underbody hold-down panel, the floor panel, the dash panel, and the cowl side panel; and a structural panel joining part disposed in the open corner to cover the opening and coupled to the underbody hold-down panel, the floor panel, the dash panel, and the cowl side panel to maintain structural integrity therebetween and provide structural reinforcement during small overlap rigid barrier impacts to facilitate reducing structural intrusion into an occupant compartment of the vehicle, wherein an underbody end of the structural panel joining part is stacked between the underbody hold-down panel and the floor panel and coupled thereto via a row of three-sheet thickness 3T spot welds, and wherein a side of the structural panel joining part and the dash panel have an overlapping and curving interaction joined together via welding.

2. The vehicle of claim 1, wherein the structural panel joining part comprises:
an interior surface and an opposite exterior surface;
a main body panel;
the underbody end;
a dash flange extending from the main body panel; and
a side flange extending from the main body panel,
wherein the main body panel extends between the underbody end, the dash flange and the side flange and is positioned at acute angles relative to each of the dash panel and the cowl side panel.

3. The vehicle of claim 2, wherein the main body panel is generally triangular and configured to extend across the corner opening formed by the convergence of the floor panel, the dash panel, and the cowl side panel.

4. The vehicle of claim 2, wherein:
the interior surface of the underbody end is coupled to the floor panel;
the exterior surface of the underbody end is coupled to the underbody hold-down panel;
the exterior surface of the dash flange is coupled to the dash panel; and
the exterior surface of the side flange is coupled to the cowl side panel.

5. The vehicle of claim 2, wherein the underbody end is further coupled to the floor panel via a row of two-sheet thickness 2T spot welds.

6. The vehicle of claim 5, wherein the row of 2T spot welds are arranged inboard of the 3T spot welds closer to the main body panel.

7. The vehicle of claim 2, wherein the dash flange is coupled to the dash panel via a row of spot welds.

8. The vehicle of claim 2, wherein the side flange is coupled to the cowl side panel via two rows of spot welds and advanced impact structural adhesive.

9. The vehicle of claim 2, wherein the structural joining part further comprises a directional stiffening bead formed in the main body panel, the directional stiffening bead defining a depression in the main body panel defined at least partially by a bottom wall, an upper wall, a lower wall, and first and second end walls.

10. The vehicle of claim 9, wherein the structural joining part further comprises a second directional stiffening bead formed in the main body panel.

11. The vehicle of claim 10, wherein the first and second directional stiffening beads extend from the side flange toward the dash flange.

12. The vehicle of claim 2, wherein:
the interior surface of the underbody end is coupled to a lower side of the floor panel via a row of first two sheet-thickness 2T spot welds;
the interior surface of the underbody end is coupled to the lower side of the floor panel, and the exterior surface of the underbody end is coupled to an upper side of the underbody hold-down panel via the 3T spot welds;
the exterior surface of the dash flange is coupled to the dash panel via a row of second 2T spot welds;
the exterior surface of the side flange is coupled to the cowl side panel via (i) rows of respective third and fourth 2T spot welds and (ii) an advanced impact structural adhesive; and
the interior surface of the dash flange is coupled to the lower side of the floor panel, and the exterior surface of the dash flange is coupled to the dash panel via a second 3T weld.

13. The vehicle of claim 1, further comprising a body-on-frame construction having a frame and a body, the body including the underbody hold-down panel, the floor panel, the dash panel, the structural cowl side panel, and the structural panel joining part.

* * * * *